May 26, 1925.  R. H. BROWN  1,539,070
SPRING
Filed April 30, 1919
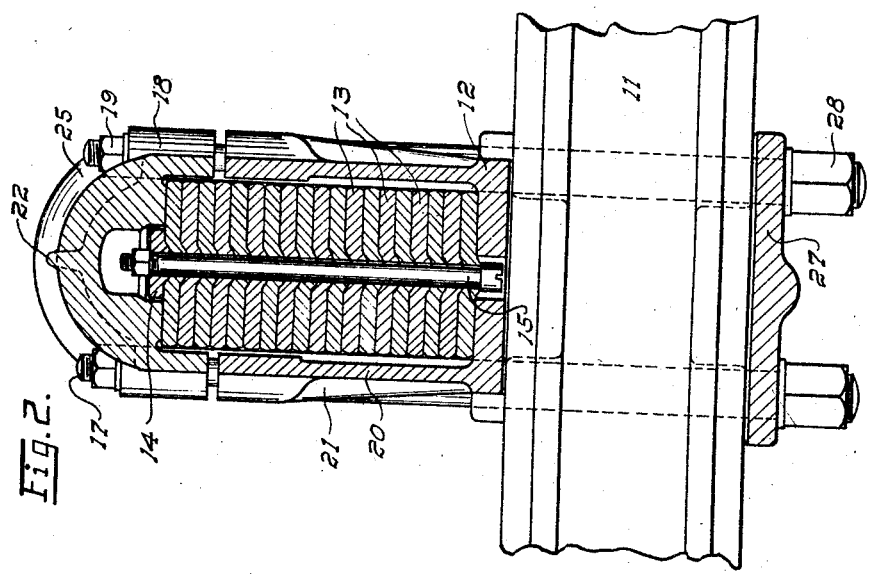
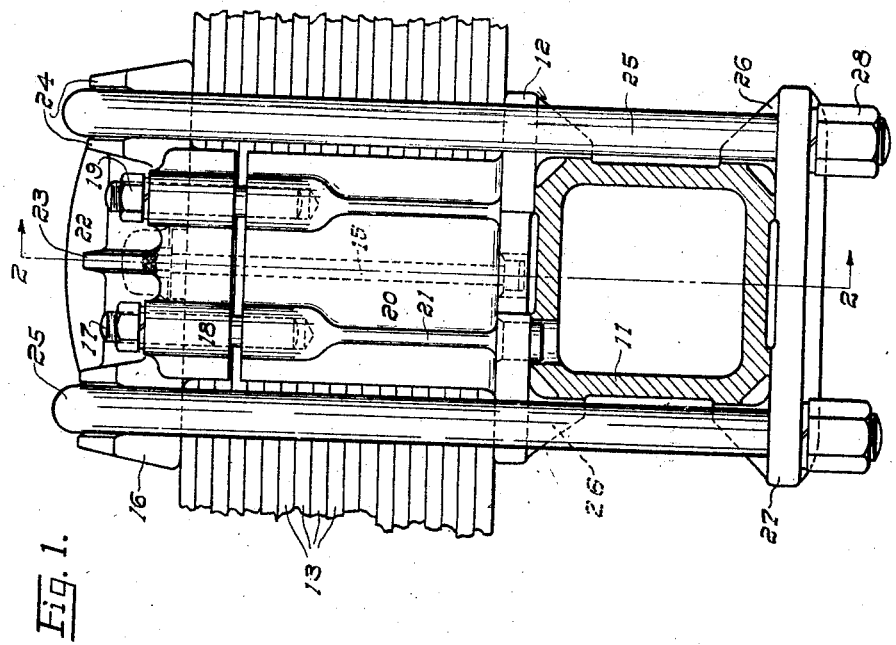
Inventor
Ralph H. Brown
Attorney Patented May 26, 1925.

1,539,070

UNITED STATES PATENT OFFICE.

RALPH H. BROWN, OF CLEVELAND, OHIO, ASSIGNOR, BY MESNE ASSIGNMENTS, TO THE EATON AXLE & SPRING COMPANY, OF CLEVELAND, OHIO, A CORPORATION OF OHIO.

SPRING.

Application filed April 30, 1919. Serial No. 293,782.

*To all whom it may concern:*

Be it known that I, RALPH H. BROWN, a citizen of the United States, and a resident of Cleveland, county of Cuyahoga, State of Ohio, have invented certain new and useful Improvements in Springs, of which the following is a specification.

This invention relates to vehicle springs and more particularly to means for clamping the leaves of a multiple leaf spring together and securing the spring with its clamping means upon the axle of a vehicle.

One of the objects of the invention is to provide means for securing a leaf spring, to a vehicle axle, which is independent of the clamping means by which the leaves of the spring are held and also to clamp the leaves so firmly together that they will not be displaced by the driving and braking forces in the axle.

Other objects of the invention and the features of novelty will be apparent from the following description, taken in connection with the accompanying drawings, in which:—

Figure 1 is a fragmentary side elevation of a spring and supporting means embodying my invention, a vehicle axle being shown in cross-section; and Figure 2 is a vertical section on line 2—2 of Figure 1.

In the drawings, 11 indicates the tubular axle of a motor vehicle upon which a spring seat 12 is mounted. In the spring seat 12, the leaves 13 of a multiple leaf spring are assembled, the spring being provided with the driving block 14 which engages the leaf at one end of the series, as shown in the drawing, and the usual center bolt 15 which extends through openings in the spring leaves and the driving block 14, to hold the parts together. The spring seat 12 and the pressure block 16 constitute a housing in which the spring is adapted to be clamped, the spring seat being provided with studs 17 which are anchored therein and extend through the lugs 18 on the pressure block 16, and which are provided with nuts 19 for clamping the parts together. The spring seat 12 has side walls 20 which extend nearly the full height of the series of leaves and are preferably reinforced by ribs 21 formed on the sides thereof. The pressure block 16 may also be reinforced by ribs as shown at 22 and 23. Near each end of the pressure block 16, there is a pair of cross ribs 24 between which seats are provided for the spring clips or U bolts 25. The spring seat 12 and the pressure block 16 have their inner faces shaped to conform to the shape of the cooperating faces of the adjacent leaves of the spring and the spring seat 12 is provided with spaced lugs 26 to engage the sides of the axle 11. A clamp plate 27 is provided to engage the opposite side of the axle, and is also provided with lugs 27 to engage the sides of the axle 11 between the legs of the spring clips 25. The base of the spring seat 12 is cut away at the corners to form recesses in which the legs of the spring clips 25 engage and the clamp plate 27 is formed with openings at the corners thereof through which the legs of the spring clips extend, the nuts 28 being provided to secure the spring upon the axle.

The spring may be assembled in the spring seat 12 and the pressure block 16 clamped thereon so that the spring will be securely held, by the studs 17 and the nuts 18. The spring and its housing may then be mounted as a unit upon the axle and secured thereto by the spring clips 25, which are thus relieved of the stresses incident to holding the spring plates in assembled relation.

Having thus described my invention, what I claim is:

1. The combination of an axle, with a multiple leaf spring, a seating member for said spring separate from and independent of the axle; a pressure block, means cooperating with said seating member and said pressure block for clamping the spring leaves therebetween when removed from the axle, and means independent of the first-mentioned means for clamping said spring seat detachably and directly to the axle, the latter means supplementing the first mentioned means to additionally clamp the spring in the spring seat.

2. The combination of an axle, with a multiple leaf spring, a seating member for said spring separably connected with said axle, a pressure block seated upon said spring, clamping bolts connecting said seating member and said pressure block with the spring therebetween, a clamping plate engaging said axle, and clamping bolts connecting said pressure block and clamping plate adapted to clamp the seating member removably upon said axle and also to the springs.

3. The combination of an axle, with a multiple leaf spring, a seating member for the spring having lugs engaging the axle, a pressure block seated upon the spring, means connecting said seating member and pressure block adapted to clamp the spring therebetween, and means connecting said pressure plate and said axle adapted to clamp the seating member removably upon the axle and to clamp the springs additionally upon the seating member.

4. The combination of an axle, with a multiple leaf spring, a seat member for the spring having side walls provided with stud bolts at opposite sides of the spring, a pressure block adapted to clamp said spring within said member by means of said bolts, a clamping plate separably engaged with said axle opposite said seating member, and bolts at opposite sides of said axle and seating member connecting said pressure block and clamping plate together.

5. The combination of an axle, with a multiple leaf spring, a seating member for the spring separably interlocked with one side of the axle, a clamping plate separably interlocked with the opposite side of the axle, a pressure block removably seated upon the spring opposite said seating member, means for clamping said spring between said pressure block and said seating member, and clips connecting said pressure block and said clamping plate adapted to clamp said seating member removably upon said axle and also to clamp the spring within said seating member independently of said first mentioned clamping means.

6. The combination of an axle, with a multiple leaf spring, a seating member for said spring separably engaged with said axle, a pressure block seated upon said springs having transversely-grooved portions, means adapted to clamp said pressure block upon the spring and said seating member removably upon said axle comprising U bolts detached from said seating member and engageable with said grooved portions of said block, and means adapted to clamp said spring between said block and seating member independently of and intermediate said U bolts to permit said U bolts to be freely attached and detached.

In testimony whereof I affix my signature.

RALPH H. BROWN.